(12) United States Patent
Watanabe et al.

(10) Patent No.: US 6,224,765 B1
(45) Date of Patent: May 1, 2001

(54) FILTER ELEMENT

(75) Inventors: Masaharu Watanabe; Eiji Suda, both of Kitakoma-gun (JP)

(73) Assignee: Kitz Corporation, Chiba-ken (JP)

( * ) Notice: Subject to any disclaimer, the term of this patent is extended or adjusted under 35 U.S.C. 154(b) by 0 days.

(21) Appl. No.: 08/778,272

(22) Filed: Jan. 2, 1997

(30) Foreign Application Priority Data

Apr. 25, 1996 (JP) .................................................. 8-127665

(51) Int. Cl.$^7$ .................................................. B01D 63/02
(52) U.S. Cl. .................... 210/321.61; 210/321.78; 210/321.8; 210/321.89; 210/500.23; 96/10
(58) Field of Search ................... 210/500.23, 500.41, 210/500.38, 500.36, 321.8, 321.89, 450, 321.61, 321.78; 244/516, 263, 279, 571; 96/10; 156/285

(56) References Cited

U.S. PATENT DOCUMENTS

| | | | |
|---|---|---|---|
| 4,935,141 | * 6/1990 | Buck et al. | 210/500.38 |
| 5,066,397 | 11/1991 | Muto et al. | 210/321.8 |
| 5,085,676 | * 2/1992 | Ekiner et al. | 210/500.44 |
| 5,472,601 | * 12/1995 | Eguchi | 210/500.23 |
| 5,490,931 | * 2/1996 | Chung et al. | 210/500.23 |
| 5,505,858 | 4/1996 | Monzen et al. | 210/321.23 |
| 5,556,591 | * 9/1996 | Jallerat et al. | 210/500.23 |

FOREIGN PATENT DOCUMENTS

| | | |
|---|---|---|
| 55-49076 | 11/1980 | (JP) . |
| 60-58208 | 4/1985 | (JP) . |
| 63-28654 | 6/1988 | (JP) . |
| 1-164405 | 6/1989 | (JP) . |
| 1-281104 | 11/1989 | (JP) . |
| 5-56227 | 7/1993 | (JP) . |
| 6-170179 | 8/1994 | (JP) . |

* cited by examiner

Primary Examiner—Ana Fortuna
(74) Attorney, Agent, or Firm—Wenderoth, Lind & Ponack, L.L.P.

(57) ABSTRACT

A filter element includes a bundle of hollow fiber type separation membranes made of a natural or synthetic macromolecular material and a sealed part made of a thermoplastic resin. The bundle has an opening in at least one terminal part thereof. The sealed part is bonded to the bundle at a temperature not higher than the melting or decomposing temperature of the macromolecular material and adapted to seal watertightly the opening of the bundle in a half-bonded state showing no compatibility with the macromolecular material and permitting persistence of the mutual interface of bondage.

11 Claims, 5 Drawing Sheets

FILTER ELEMENT

BACKGROUND OF THE INVENTION

1. Field of the Invention

This invention relates to a filter element for the treatment of a fluid by the use of a reverse osmosis membrane, an ultrafilter membrane, a precision filter membrane, or a gas separation membrane as a separation membrane for various fluids which are used in various industries specializing in manufacture of electronic products, foodstuffs, beverages, medicines, fermentation Products, optical products, therapeutic products and precision products.

2. Description of the Prior Art

In the treatment of various fluids by the use of functional macromolecular membranes represented by the separation membranes mentioned above, the functional macromolecular membranes are generally required to be modular units. The separation membranes are formed into flat plates, tubes, hollow fibers, etc. and their modular units have their shapes determined by the shape of a relevant separation membrane.

The modules of flat plate type separation membranes are disclosed in JP-UM-B-55-49076 and JP-P-B-63-28654, for example. The former module is in such a shape as is obtained by punching a disc out of a flat plate type separation membrane and setting the disc directly in place on a holder and the latter module is in such a shape as is obtained by similarly punching a disc, joining the disc along the circumference thereof to a support, thereby forming a unit, and superposing a plurality of such units. JP-P-A-60-58208 also discloses a module which is in such a shape as is obtained by pleating a flat plate type separation membrane, joining the opposite edges of the membrane and converting the membrane into a tubular membrane, and closing the opposite open ends of the tubular membrane with a sealing material.

The modules using hollow fiber type separation membranes (hereinafter referred to as "modules of filter element") are disclosed in JP-UM-A-05-56227 and JP-P-A-06-170179, for example. They are in such a shape as is obtained by bundling a plurality of hollow fiber type separation membranes and closing one open end or both open ends of the bundle with a sealing material to create a watertight seal. The modules of filter element of this type are allowed to assume a large available membrane surface per unit volume of module because they do not require any support for membrane. Particularly, the inner surfaces of membrane are kept clean because the inner surfaces are not exposed to the open air. They also retain a high ability to clean the fluid under treatment by using the inner surfaces on the secondary side of fluid treatment. Further it is easy to manufacture cross flow type modules.

The modules of filter element possess various features besides those mentioned above as compared with the modules using the flat plate type and the tubular type separation membranes. In the manufacture thereof, the primary sides and the secondary sides thereof, relative to the flow of the fluid under treatment, must be watertight to isolate mutually in the open end parts of the bundle. For this purpose, the gaps between the adjacent hollow fiber type separation membranes must be sealed infallibly. This sealing has been, heretofore, attained generally by potting the gaps with such a potting material as polyurethane or epoxy resin which exhibits high flowability and, when mixed with other resin, manifests a hardening reaction. When the fluid subjected to the filtration is a highly active chemical substance such as acid or alkali, alcohol, ketone, ester, aromatic hydrocarbon, or chlorine type solvent and when such physical or mechanical working conditions as temperature and pressure are harsh, however, the modules are susceptible to physical and chemical invasion. When the potting material is improperly selected or the bonding strength is weak, the sealed parts tend to sustain a crack or peal. The modules of filter element thus have the problem of limiting the range of application in terms of the kind of fluid subjected to the treatment and the condition of use because they are deficient in durability.

The modules of filter element proposed in JP-P-A-01-164405 and JP-P-A-01-281104 for the Purpose of solving the problem mentioned above are such that the sealed parts are formed of a thermoplastic resin which is either identical to or compatible with the material for the hollow fiber type separation membranes. In this case, however, the hollow fiber type separation membranes in the sealed parts are thermally deteriorated or deprived of porosity to the extent of ultimate loss flexibility. To be specific, while the watertight contact between the hollow fiber type separation membranes and the sealed parts gains in thoroughness, the parts of the hollow fiber type separation membranes which are embedded in the sealed parts are embrittled to a point where they will be liable to succumb to chemical and physical invasion, hence sustain a crack. Further, the sealed parts in the conventional modules have no room for absorbing expansion or contraction, hence they have the problem of sustaining a crack in the sealed parts themselves or in the hollow fiber type separation membranes.

This invention has been developed as a result of numerous diligent studies pursued with a view to overcoming the problems suffered by the prior art as described above. The object of this invention is to provide a filter element which is possessed of high durability to resist various chemical and physical invasion.

SUMMARY OF THE INVENTION

To accomplish the object mentioned above, the filter element of this invention comprises a bundle of hollow fiber type separation membranes made of a natural or synthetic macromolecular material, the bundle having an opening in at least one terminal part thereof; and a sealed part made of a thermoplastic resin, bonded to the bundle at a temperature not higher than a melting or decomposing temperature of the macromolecular material. The sealed part is adapted to create a watertight seal in the opening of the bundle in a half-bonded state showing no compatibility with the macromolecular material and permitting persistence of a mutual bonding interface bondage.

DETAILED DESCRIPTION OF THE INVENTION

Figure 1:
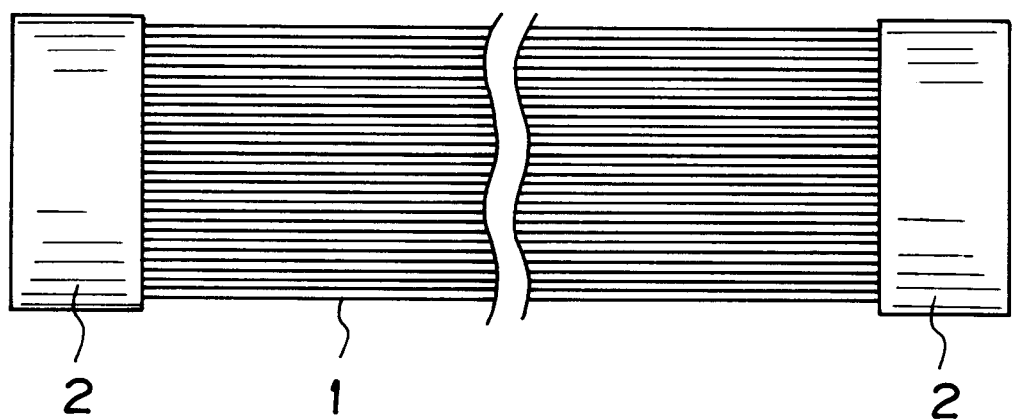
FIG. 1 is a schematic front view showing one example of the filter element according to this invention.
Figure 2:
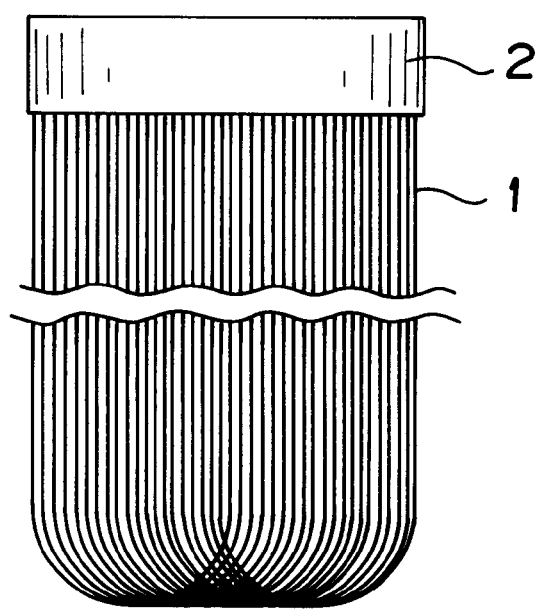
FIG. 2 is a schematic front view showing another example of the filter element according to this invention.
Figure 3:
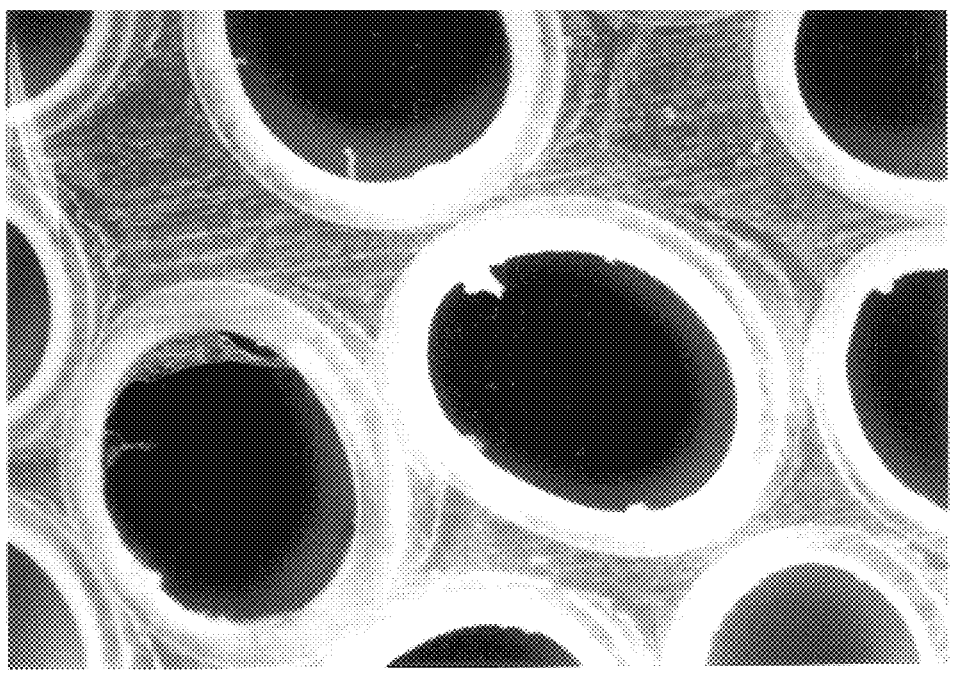
FIG. 3 is a photomicrograph showing the open terminal part of the filter element of FIG. 1 at 100 magnifications.
Figure 4:
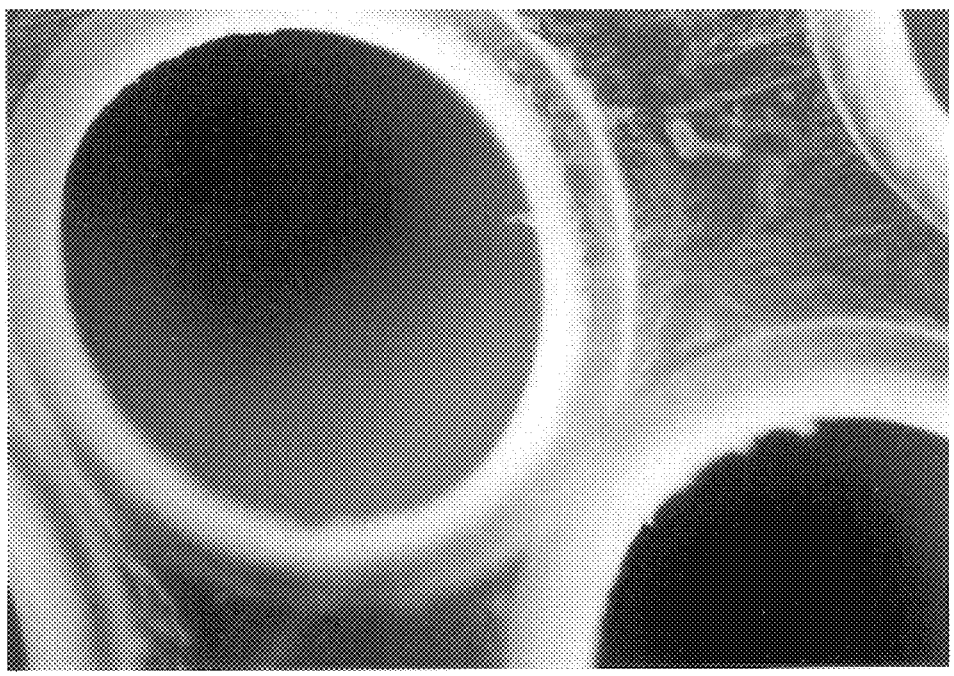
FIG. 4 is a photomicrograph showing the open terminal part of the filter element of FIG. 1 at 200 magnifications.

The filter element contemplated by this invention, as shown in FIG. 1 or FIG. 2, comprises a plurality of hollow fiber type separation membranes 1 made of a macromolecular material and a sealed part 2 made of a thermoplastic resin for watertight sealing the open terminal parts of the bundled hollow fiber type separation membranes 1 in a half-bonded state showing no compatibility with the macromolecular material and permitting persistence of the mutual interface of bonding.

Appropriately, the hollow fiber type separation membranes 1 are such asymmetric hollow fiber type separation membranes as reverse osmosis membranes, ultrafilter membranes, or gas separation membranes which have a smooth skin layer on the inner surface thereof and a minutely jogging support layer on the outer surface thereof. The separation membranes 1 appropriately have a microporous texture containing pores of a largest diameter in the range of 0.01 to 5 μm. The material for the hollow fiber type separation membranes 1 is appropriately a flexible natural or synthetic macromolecular compound such as cellulose, cellulose ester, polysulfone, polyether sulfone, polypropylene, polyethylene, polyamide or polyacrylonitrile. The material may also be an inorganic substance such as metal, glass, or ceramic substance.

The material for the sealed part 2 appropriately is such a thermoplastic resin as exhibits perfect flowability at the melting temperature thereof. As concrete examples of the thermoplastic resin advantageously used herein, olefin type resins such as polyethylene and polypropylene, copolymers of tetrafluoroethylene with polyfluoroalkyl ethers resembling in molecular structure to polyethylene and polypropylene (referred to hereinafter as "PFA"), and such fluorine type resins as polytetrafluoroethylene (referred to hereinafter as "PTFE") and fluorinated ethylene propylene (referred to hereinafter as "FEP") may be cited. It is essential that this material should possess a melting point lower than the melting or decomposing temperature of the material for the hollow fiber type separation membranes 1. Preferably, the difference between the temperatures of the two materials is not less than 20° C. The selection of the material for the sealed part 2 depends on the chemical properties of the fluid under treatment and the conditions of use thereof.

Generally, when two shaped articles using thermoplastic resins as raw materials and obtained by the method of forming, such as injection molding or extrusion molding, are thermally fused to each other, it is essential that their raw materials should be compatible with each other. More often than not the asymmetric separation membranes, such as reverse osmosis membranes or ultrafilter membranes, which have a skin layer and a support layer have a relatively smooth skin layer on the inner surface thereof and nevertheless a minutely jogging support layer on the outer surface thereof. The microporous precision filter membranes similarly have a minutely jogging outer surface. These filter membranes, therefore, are capable of physically thorough watertight sealing owing to the anchor effect arising from the entry of the fused member into the minutely jogging outer surface even in the absence of compatibility with the fused member.

In the open terminal parts of the bundled hollow fiber type separation membranes 1, by selectively melting the raw material for the sealed part 2 and consequently forming the sealed part 2 while permitting persistence of a definite interface of bonding between the hollow fiber type separation membranes 1 and the sealed part 2 instead of using a thermoplastic resin identical to or compatible with the raw material for hollow fiber type separation membranes 1 and attaining thorough mutual fusion, therefore, the deterioration of the parts of the hollow fiber separation membranes 1 embedded in the sealed part 2 and the neighborhood of the base of the sealed part 2 due to the influence of heat can be repressed to the smallest possible extent and, at the same time, the hollow fiber type separation membranes 1 can be made to keep the inherent flexibility intact. Thus, the produced filter element is strong enough to withstand chemical and physical invasion and is capable of ensuring infallible bondage between the open terminal parts of the bundled hollow fiber separation membranes 1 and the sealed part 2.

The methods which are available for the formation of the sealed part 2 for example include: (1) A method which comprises preparing paste by suspending a fine powder of the raw material for the sealed part 2 in alcohol, followed by dipping the open terminal parts of the bundled hollow fiber type separation membranes 1 into the paste. The bundle is then baked in an atmosphere of a temperature not higher than the melting temperature of the raw material for the hollow fiber type separation membranes 1 and not lower than the melting temperature of the raw material for the sealed part 2, followed by cooling the baked bundle, (2) A method which comprises melting the resin as the raw material for the sealed part 2 in a depressed metallic die to a temperature not higher than the melting temperature of the raw material for the hollow fiber type separating membranes 1. Then the open terminal parts of the bundled hollow fiber type separation membranes 1 are inserted into the melt of the raw material for the sealed part 2 to conduct first sealing, followed by again inserting the open terminal parts of the bundled hollow fiber type separation membranes 1 into the melt of the raw material for the sealed part 2 while the melt is at a temperature not higher than the melting temperature of the raw material for the hollow fiber type separation membranes 1 to conduct second sealing. Finally the is cooled (3) A method which comprises melting polyurethane or epoxy resin in the same manner as the conventional sealed part and casing the resultant melt of the raw material for the sealed part 2 into a given mold while the melt is at a temperature not higher than the melting temperature of the raw material for the hollow fiber type separation membranes 1.

The effects manifested by the difference in properties of the hollow fiber type separation membranes 1 on the insertion of the hollow fiber type separation membranes 1 in the melt of thermoplastic resin as the raw material for the sealed part will be described below with reference to Tables shown below.

The flexure at the free end of hollow fiber type separation membranes under the weight of their own when supported in the manner of a cantilever is shown in Table 1.

TABLE 1

| Flexure (mm) | Result of Insertion of Hollow Fiber Type Semipermeable Membranes |
|---|---|
| 30 | Good |
| <65 | Good, depending on conditions of insertion |
| 100 | Bad, with reference to conditions of insertion |
| 150 | Bad, with reference to conditions of insertion |

The relationship between the strength of hollow fiber type separation membranes at rupture and the condition of damage by insertion of the hollow fiber type semipermeable membranes is shown in Table 2.

TABLE 2

Strength at Rupture Condition of Damage by Insertion of Hollow Fiber Type Semipermeable Membranes

| | |
|---|---|
| 120 gf/membrane | No damage by insertion |
| 90 gf/membrane | No damage by insertion |
| 60 gf/membrane | Insertion without damage obtainable, depending on conditions of insertion |
| 30 gf/membrane | No insertion obtainable, without reference to conditions of insertion |

From the results given above, it is clear that the terminal parts of the hollow fiber type separation membranes can be inserted in a perfect state into the thermoplastic resin when the hollow fiber type separation membranes have a flexure of not more than 65 mm under the weight of their own and a strength of not less than 60 gf/membrane at rupture. The conditions for the insertion to be used when the flexure under weight is 65 mm and the strength at rupture is 60 gf/membrane are 50,000 to 500,000 cp of the viscosity of thermoplastic resin, 0.05 to 5 mm/min of the speed of insertion, and not less than 20° C. as the difference between the melting points of the thermoplastic resin and the hollow fiber type separation membranes.

It is, therefore, appropriate to select hollow fiber type semipermeable membranes 1 of a quality such that the flexure under weight may be not more than 65 mm in the free end of a cantilever 150 mm in length and that the strength at rupture may be not less than 60 gf/membrane.

Now, a method for the production of a filter element which fulfills the conditions mentioned above will be cited below by way of example.

Hollow fiber type separation membranes 150 mm in length using polypropylene resin as the raw material and manifesting a flexure under weight of 30 mm in the free end of a cantilever and a strength of 160 gf/membrane at rupture are bundled so that the ratio of the cross section of the sealed part to the total cross section of the bundled hollow fiber type separation membranes may fall in the range of 30 to 65%, and the open terminal parts of the bundled hollow fiber type separation membranes are sealed.

Then, the polyethylene resin as the raw material for the sealed part is melted at a temperature not higher than the thermally melting temperature or the decomposing temperature of the polypropylene resin as the raw material for the hollow fiber type separation membranes and not lower than the melting temperature of the polyethylene resin, and the open terminal parts of the bundled hollow fiber type separation membranes are inserted in the resultant melt. At this time, the polyethylene resin has a melt viscosity in the range of 50,000 to 500,000 cp and the hollow fiber type separation membranes are inserted at a rate in the range of 0.05 to 5 mm/min.

Subsequently, the molten polyethylene resin is gradually cooled and solidified at a temperature about 20° C. lower than the melting point of the polyethylene resin to form a sealed part in a half-bonded state showing no perfect compatibility with the hollow fiber type separation membranes and permitting persistence of a definite interface of bondage therebetween. Then, the open terminal parts of the bundle of a plurality of hollow fiber type separation membranes form a watertight seal in the sealing part are opened by cutting off or thermally melting the leading ends of the sealed part.

Now, working examples of the module of filter element according to this invention will be described in detail below in combination with comparative experiments.

Comparative Experiment 1

A module of filter element was formed by bundling 590 hollow fiber type separation membranes made of polypropylene, 0.1 $\mu$m in maximum pore diameter, 400 $\mu$m in outside diameter and 250 $\mu$m in inside diameter, inserting the bundle in an outer tube made of polycarbonate, and forming a sealed part made of polyurethane by the conventional method of centrifugal casting. Then, this module of filter element was kept immersed in isopropyl alcohol at room temperature for 100 days, dried at 60° C. for 48 hours, again immersed in isopropyl alcohol, and tested by the standard method for the determination of bubble point. The test could not be accomplished because the sealed part of polyurethane and the outer tube of polycarbonate separated along the interface of bondage.

Comparative Experiment 2

A module of filter element was formed by bundling 800 fiber type separation membranes made of polysulfone, 0.1 $\mu$m in maximum pore diameter, 450 $\mu$m in outside diameter and 300 $\mu$m in inside diameter, inserting the bundle in an outer tube made of polycarbonate, and forming a sealed part made of epoxy resin by the conventional method of centrifugal casting. Then, this module was kept immersed in an aqueous alkaline detergent solution of pH 12 at 60° C. for two weeks, washed with water, and tested with water for the determination of bubble point. The test could not be accomplished because the sealed part of epoxy resin and the outer tube of polycarbonate separated along the interface of bondage.

Comparative Experiment 3

An effort to form a module of filter element by bundling 600 hollow fiber type separation membranes made of polypropylene, 0.1 $\mu$m in maximum pore diameter, 400 $\mu$m in outside diameter and 250 $\mu$m in inside diameter, preparing paste by suspending fine powder of polypropylene in methyl alcohol, applying the paste to the open terminal parts of the bundled hollow fiber type separation membranes, inserting the bundle in an outer tube made of polypropylene, and forming a sealed part by locally heating the neighborhood of the open terminal parts of the hollow fiber type separation membranes at 180° C. in accordance with the method disclosed in JP-P-A 01-164405 failed because the neighborhood of base of the sealed part of the hollow fiber type separation membranes was melted and, at the same time, the parts of the hollow fiber type separation membranes embedded in the sealed part were melted and wholly disintegrated.

The formation of a module of filter element capable of resisting chemical and physical invasion by using a thermoplastic resin as the material for a sealed part formed in the open terminal parts of bundled hollow fiber type separation membranes has been conceived as partly disclosed in JP-P-A-01-164405. As demonstrated in the comparative experiments, however, the measure which consists in using as the material for a sealed part a thermoplastic resin simply on account of compatibility thereof with the hollow fiber type separation membranes and thermally melting this thermoplastic resin actually was capable of forming the sealed part only with a resin of very poor flowability at the melting point even when the material for the hollow fiber type separation membranes was such a thermoplastic resin as PTFE. This is because the neighborhood of the base of the sealed part of the hollow fiber type separation membranes and the part embedded in the sealed part were liable to melt and disintegrate.

Example 1

A module of filter element was formed by bundling 620 hollow fiber type separation membranes made of polypropylene, 0.1 μm in maximum pore diameter, 400 μm in outside diameter and 250 μm in inside diameter, inserting the bundle in an outer tube made of low-density polyethylene, preparing paste by dispersing the raw material for a sealed part in ethyl alcohol, injecting the paste in the opposite open terminals of the outer tube, baking the outer tube thus prepared in an oven at 120° C. for 12 hours, and allowing the baked outer tube to stand and then cool in the oven. This module was kept immersed in isopropyl alcohol at room temperature for 120 days, dried at 60° C. for 48 hours, immersed again in isopropyl alcohol, and tested for bubble point. It was consequently found to have a bubble point value of 3.4 kg/cm$^2$, a normal level.

Example 2

A module of filter element was formed by bundling 780 hollow fiber type separation membranes made of polysulfone, 0.1 μm in maximum pore diameter, 450 μm in outside diameter and 300 μm in inside diameter, inserting the bundle in an outer tube made of high-density polyethylene, melting high-density polyethylene in advance at 140° C. in a depressed metallic die, inserting the open terminal parts of the bundled hollow fiber type separation membranes in the melt of high-density polyethylene, and allowing the wetted open terminal parts to cool gradually. Then, this module was kept immersed in an aqueous alkaline detergent solution of pH 12 at 60° C. for 15 days, washed with water, and tested for bubble point. It was consequently found to have a bubble point value of 3.8 kg/cm$^2$, a normal level.

Example 3

A module of filter element was formed by bundling 50 ultrafilter membranes made of polysulfone, 1200 μm in outside diameter and 700 μm in inside diameter, inserting the bundle into an outer tube made of polypropylene, preparing the raw material for a sealed part in the form of paste having a fine powder of polypropylene dispersed in ethyl alcohol, inserting the open terminal parts of the hollow fiber type separation membranes in the paste, heating only the open terminal parts in an oven at 180° C. for 12 hours, and allowing the hot terminal parts to cool gradually in the oven. This module was kept immersed in an aqueous 5% dilute hydrochloric acid solution at room temperature for six weeks, washed with water, and tested for leakage by the standard method of applying pneumatic pressure to the module from the primary side while immersing the module in water. It was consequently found to have no leakage.

The filter elements which were formed by using a natural or synthetic macromolecular compound as the raw material for hollow fiber type separation membranes and a thermoplastic resin as the raw material for a sealed part, setting the temperature for the formation of the sealed part at a level not higher than the thermally melting temperature or the decomposition temperature of the raw material for the formation of hollow fiber type separation membranes and not lower than the thermally melting temperature of the sealed part made of the thermoplastic resin, and forming the hollow fiber type separation membranes and the sealed part in a half-bonded state permitting persistence of a definite interface of bondage between the hollow fiber separation membranes and the sealed part, under conditions such that the physical properties of the parts of hollow fiber type separation membranes embedded in the sealed part and the exposed parts thereof might not be substantially varied, were strong enough to withstand chemical or physical invasion as compared with the filter elements formed by the conventional method using a sealed part made of polyurethane and epoxy resin.

Now, concrete examples of the cartridge of filter element and the module thereof according to this invention will be described below with reference to the accompanying drawings.

Figure 5:
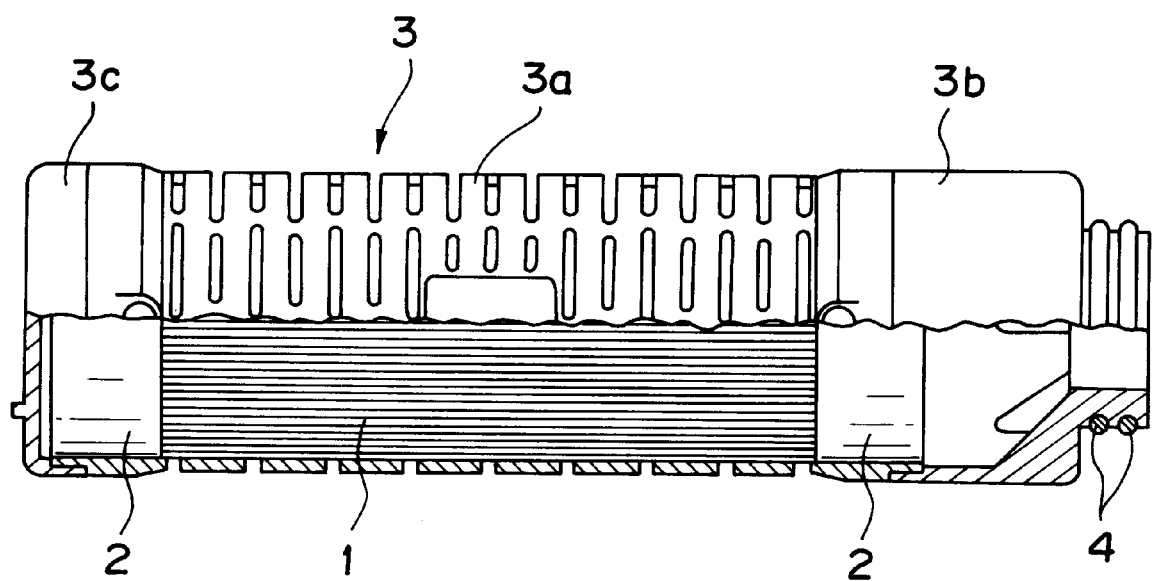
FIG. 5 is a half-cut cross section showing one example of a cartridge accommodating and protecting the filter element of FIG. 1.

FIG. 5 is a half-cut cross section showing one example of a cartridge of filter element according to this invention. In the diagram, 1 stands for hollow fiber type semipermeable membranes made of a natural or synthetic macromolecular compound, 2 for a sealed part made of a thermoplastic resin having a melting temperature not higher than the thermally melting point or the decomposing temperature of the raw material for the hollow fiber type separation membranes, 3 for a casing for accommodating and protecting a bundle of a plurality of hollow fiber type semipermeable membranes 1, 3a for the main body of the casing 3, 3b and 3c each for the cap of the casing 3, and 4 for an O ring. The sealed part 2 creates a watertight seal on the open terminal parts of the bundled hollow fiber type semipermeable membranes 1 and, at the same time, adheres by fusion to the inner wall surface of the open terminal part of the main body 3a of the casing 3, creating a watertight seal.

Figure 6:
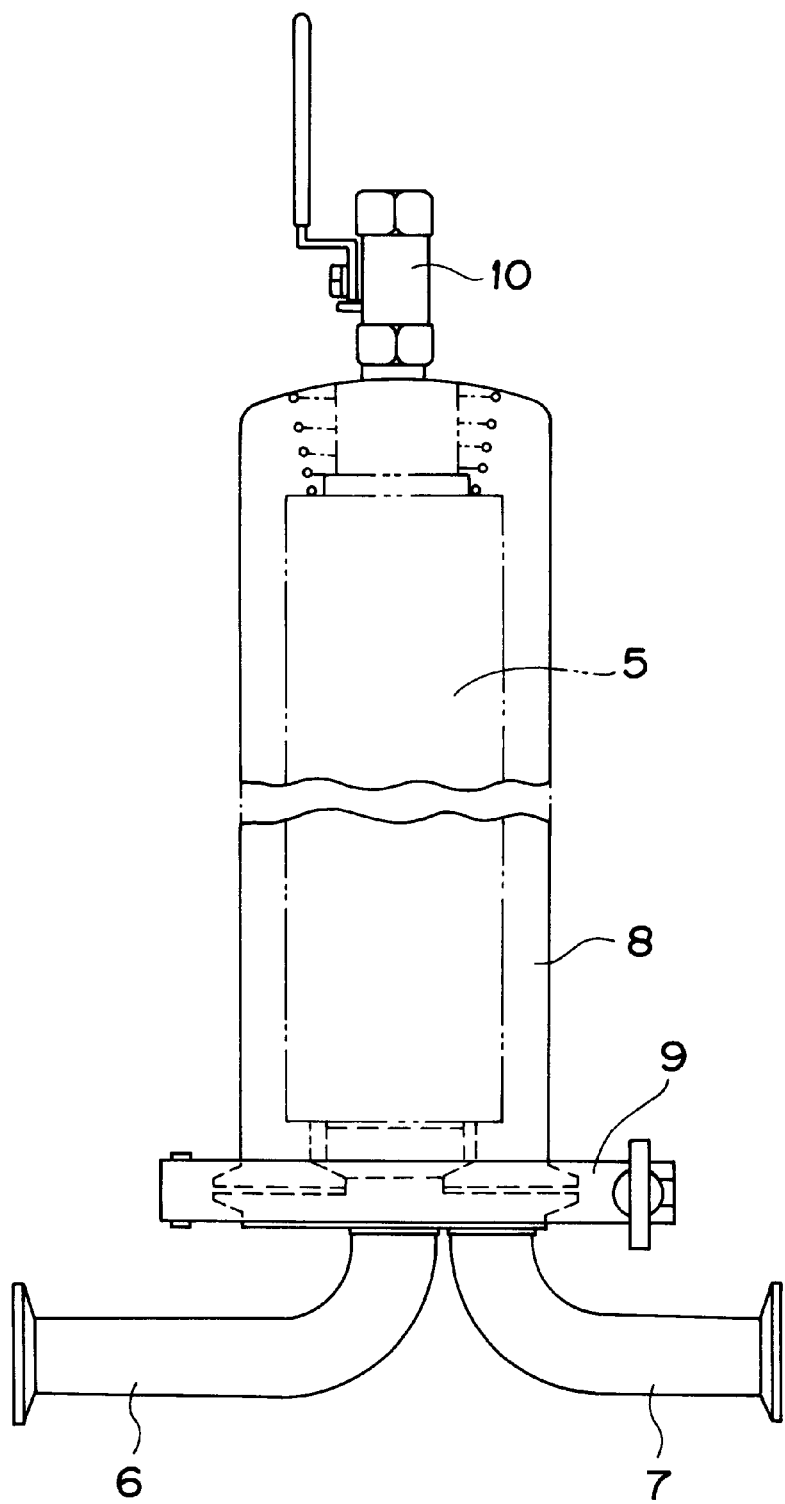
FIG. 6 is a schematic front view of a device incorporating therein another example of a cartridge of filter element.

FIG. 6 is a schematic front view showing a device incorporating therein another example of cartridge of filter element according to this invention. In FIG. 6, 5 stands for a cartridge of filter element, 6 for an outlet for a fluid, 7 for an inlet for the fluid, 8 for a housing, 9 for a clamp band, and 10 for a valve for deaeration.

Figure 7:
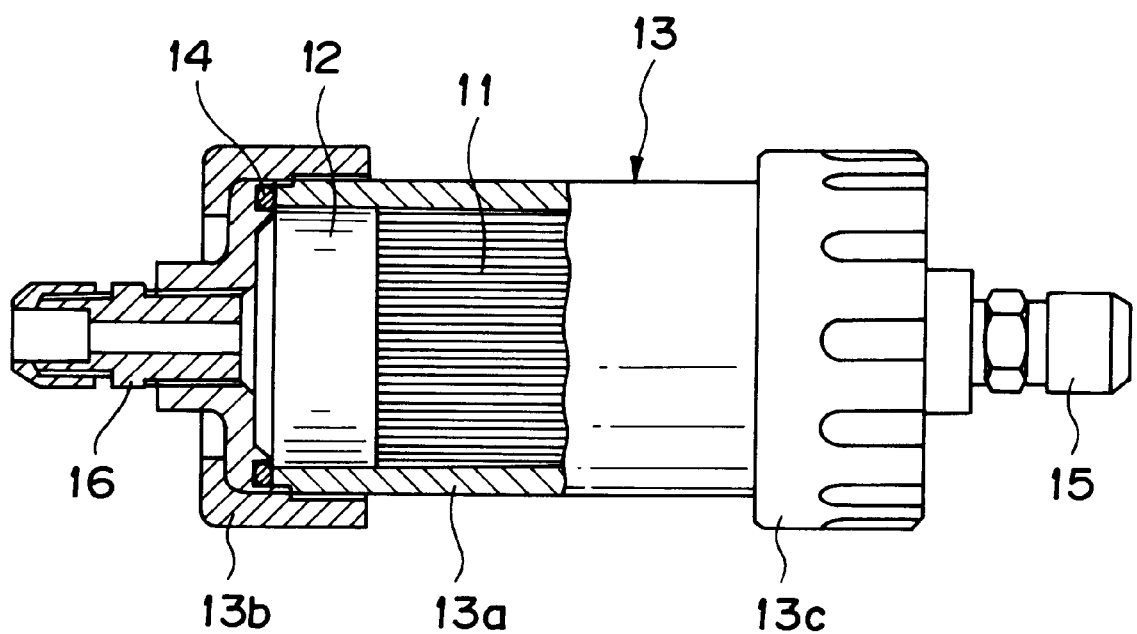
FIG. 7 is a half-cut cross section showing one example of a module accommodating and protecting still another example of the filter element according to this invention.

FIG. 7 is a half-cut cross section showing one example of a module of filter element according to this invention. In the diagram, 11 stand for hollow fiber type semipermeable membranes made of a natural or synthetic macromolecular compound, 12 for a sealed part made of a thermoplastic resin having a melting temperature not higher than the thermally melting temperature or the decomposing temperature of the raw material for the hollow fiber type separation membranes, 13 for a housing for accommodating and protecting a bundle of a plurality of the hollow fiber type semipermeable membranes 11, 13a for the main body of the housing 13, 13b and 13c each for the cap for the housing 13, 14 for an O ring, 15 for an inlet for a fluid, and 16 for an outlet for the fluid. The sealed part 12 watertightly seals the open terminal parts of the bundled hollow fiber type semipermeable membrane 11 and, at the same time, adheres by fusion to the inner wall surface of the open terminal part of the main body 13a of the housing 13, creating a watertight seal.

It is clearly noted from the description given above that since the filter element according to this invention have the sealed parts thereof formed in a half-bonded state with hollow fiber type separation membranes and consequently permit persistence of an interface of bondage therebetween, the hollow fiber type separation membranes offer strong resistance to chemical and physical invasion at no sacrifice of the inherent physical properties and have no possibility of being disintegrated or deteriorated by the heat being used during the formation of the sealed parts. Further, the sealed parts can cope with various fluids because the raw material therefor is not limited to a substance identical to or compatible with the raw material for the hollow fiber type separation membranes.

The invention will be better understood and objects, features, and characteristics thereof other than those set forth above will become apparent when consideration is given to the above detailed description, which makes reference to the accompanying drawings.

What is claimed is:

1. A filter element comprising:
   a bundle of hollow fiber separation membranes made of a natural or synthetic macromolecular material, said bundle having an opening in at least one terminal part thereof; and
   a sealed part made of a thermoplastic resin, bonded to said bundle at a temperature lower than a melting or decomposing temperature of said macromolecular material, wherein said sealed part forms a watertight seal at said opening of said bundle, has a mutual bonding interface between the membranes and the thermoplastic resin and shows no compatibility with said macromolecular material.

2. The filter element according to claim 1, wherein said hollow fiber separation membranes are asymmetric membranes having a smooth skin layer on an inner surface thereof and a finely jogging support layer on an outer surface thereof.

3. The filter element according to claim 2, wherein said asymmetric membranes are reverse osmosis membranes.

4. The filter element according to claim 2, wherein said asymmetric membranes are ultrafilter membranes.

5. The filter element according to claim 2, wherein said asymmetric membranes are gas separation membranes.

6. The filter element according to claim 1, wherein said hollow fiber separation membranes are microporous hollow fiber separation membranes containing pores of a largest diameter in the range of 0.01 to 5 $\mu$m.

7. The filter element according to claim 1, wherein said thermoplastic resin is one member selected from the group consisting of a polyolefin resin, a copolymer of tetrafluoroethylene with polyfluoroalkyl ethers and a fluorine resin.

8. The filter element according to claim 7, wherein said polyolefin resin is one member selected from the group consisting of polyethylene and polypropylene.

9. The filter element according to claim 7, wherein said fluorine resin is one member selected from the group consisting of polytetrafluoroethylene and fluorinated ethylene propylene.

10. The filter element according to claim 1, wherein said hollow fiber separation membranes have a length of 150 mm, manifest a flexure of not more than 65 mm at a free end thereof under their own weight when supported in the manner of a cantilever, and exhibit strength of not less than 60 gf/membrane at rupture.

11. The filter element according to claim 1, wherein said macromolecular material is one member selected from the group consisting of cellulose, cellulose ester, polysulfone, polyether sulfone, polypropylene, polyethylene, polyamide, and polyacrylonitrile.

* * * * *